US011090574B2

(12) United States Patent
Jeromin et al.

(10) Patent No.: US 11,090,574 B2
(45) Date of Patent: Aug. 17, 2021

(54) ELECTROMAGNETIC ANIMATED FIGURE CONTROL SYSTEM

(71) Applicant: Universal City Studios LLC, Universal City, CA (US)

(72) Inventors: Aaron Chandler Jeromin, Winter Garden, FL (US); Akiva Meir Krauthamer, Orlando, FL (US); Elam Kevin Hertzler, Winter Garden, FL (US)

(73) Assignee: Universal City Studios LLC, Universal City, CA (US)

( * ) Notice: Subject to any disclaimer, the term of this patent is extended or adjusted under 35 U.S.C. 154(b) by 0 days.

(21) Appl. No.: 16/789,194

(22) Filed: Feb. 12, 2020

(65) Prior Publication Data

US 2020/0384374 A1    Dec. 10, 2020

Related U.S. Application Data

(60) Provisional application No. 62/858,677, filed on Jun. 7, 2019.

(51) Int. Cl.
*A63H 11/00* (2006.01)
*A63H 3/06* (2006.01)
(Continued)

(52) U.S. Cl.
CPC ............... *A63H 11/00* (2013.01); *A63H 3/06* (2013.01); *A63H 33/26* (2013.01); *A63H 3/02* (2013.01); *A63H 3/28* (2013.01); *A63H 2200/00* (2013.01)

(58) Field of Classification Search
CPC . A63H 11/00; A63H 3/06; A63H 3/20; A63H 33/26; A63H 2200/00
See application file for complete search history.

(56) References Cited

U.S. PATENT DOCUMENTS

| | | | | |
|---|---|---|---|---|
| 3,153,881 | A | * | 10/1964 | Baulard-Cogan ...... A63H 3/001 446/180 |
| 3,767,901 | A | * | 10/1973 | Black ...................... G06T 13/00 318/568.11 |

(Continued)

OTHER PUBLICATIONS

Weiss, Malte et al., "Actuated Translucent Controls for Dynamic Tangible Applications on Interactive Tabletops," ITS'09: Extended Abstracts of ACM International Conference on Interactive Tabletops andSurfaces, ACM, Nov. 2009.

(Continued)

*Primary Examiner* — Eugene L Kim
*Assistant Examiner* — Alyssa M Hylinski
(74) *Attorney, Agent, or Firm* — Fletcher Yoder P.C.

(57) ABSTRACT

The present disclosure relates generally to an electromagnetic animated figure control system. More specifically, the present disclosure relates to techniques for actuating a figure, such as a plush toy, using addressable control nodes (e.g., electromagnetic coils) of an electromagnetic array. For example, an amusement park may include a control surface implemented to include the electromagnetic array. Further, an animated figure may include magnets in one or more components. Accordingly, while the animated figure may lack a power source, the animated figure may be controlled (e.g., actuated) via a controlled magnetic interaction between the control surface and the magnets.

19 Claims, 3 Drawing Sheets

(51) Int. Cl.
  *A63H 33/26* (2006.01)
  *A63H 3/02* (2006.01)
  *A63H 3/28* (2006.01)

(56) References Cited

U.S. PATENT DOCUMENTS

| | | | |
|---|---|---|---|
| 4,588,348 A | 5/1986 | Beni et al. | |
| 4,611,377 A | 9/1986 | McCormick et al. | |
| 6,355,491 B1 | 3/2002 | Zhou et al. | |
| 6,586,859 B2 | 7/2003 | Kornbluh et al. | |
| 6,682,392 B2* | 1/2004 | Chan | A63H 13/06 446/175 |
| 6,785,539 B2 | 8/2004 | Hale et al. | |
| 7,131,887 B2 | 11/2006 | Hornsby et al. | |
| 7,224,967 B2 | 5/2007 | Hale et al. | |
| 7,905,790 B2 | 3/2011 | Schnuckle | |
| 8,060,255 B2 | 11/2011 | Wieland | |
| 8,220,260 B2 | 7/2012 | Harris | |
| 8,382,550 B2 | 2/2013 | Kang | |
| 8,602,857 B2* | 12/2013 | Morichau-Beauchant | A63F 13/06 463/6 |
| 9,011,197 B2* | 4/2015 | Smoot | A63J 19/00 446/362 |
| 9,959,962 B2* | 5/2018 | Bassett | H01F 7/0205 |
| 2006/0121823 A1 | 6/2006 | Chang | |
| 2008/0011184 A1* | 1/2008 | Lopatinsky | A63H 19/24 104/282 |
| 2010/0197194 A1* | 8/2010 | Kang | A63H 13/04 446/267 |
| 2010/0227527 A1 | 9/2010 | Smoot et al. | |
| 2011/0272884 A1* | 11/2011 | Kraegeloh | A63F 3/02 273/237 |
| 2014/0321022 A1* | 10/2014 | Mori | H01F 7/064 361/144 |
| 2015/0185734 A1* | 7/2015 | Minoiu-Enache | G05D 1/0223 701/25 |
| 2015/0258683 A1* | 9/2015 | Izhikevich | A63H 3/20 700/250 |
| 2015/0339021 A1* | 11/2015 | Duteil | G06F 3/0346 345/156 |
| 2016/0087693 A1* | 3/2016 | Shimomura | A63F 13/98 340/10.1 |
| 2017/0200544 A1 | 7/2017 | Bassett et al. | |
| 2017/0269586 A1* | 9/2017 | D'Andrea | G05D 1/028 |
| 2019/0038978 A1* | 2/2019 | Rider | A63F 13/285 |

OTHER PUBLICATIONS

Wiiss, Malte et al., "Madgets: Actuating Widgets on Interactive Tabletops," Proceedings of UIST'10, ACM, 2010, pp. 293-302.
Weiss, Malte et al., "Rendering Physical Effects in Tabletop Controls," CHI'11: Proceedings of the twenty-ninth annual SIGCHI conference on Human factors in computing systems, ACM, May 2011, pp. 3009-3012.
PCT/US2020/035820 Invitation to Pay Additional Fees Sep. 11, 2020.

* cited by examiner

ELECTROMAGNETIC ANIMATED FIGURE CONTROL SYSTEM

CROSS-REFERENCE TO RELATED APPLICATION

This application claims the benefit of U.S. Provisional Application No. 62/858,677, entitled "ELECTROMAGNETIC ANIMATED FIGURE CONTROL SYSTEM," filed Jun. 7, 2019, which is incorporated herein by reference in its entirety for all purposes.

BACKGROUND

This section is intended to introduce the reader to various aspects of art that may be related to various aspects of the present disclosure, which are described below. This discussion is believed to be helpful in providing the reader with background information to facilitate a better understanding of the various aspects of the present disclosure. Accordingly, it should be understood that these statements are to be read in this light, and not as admissions of prior art.

Animated figures or characters may be moved or animated via robotics, which may include internal motors, cables, pneumatic tubing, mechanical actuators, and the like. Such features generally require a power source to provide impetus for actuation and a control mechanism (e.g., an automation controller) to manage the actuation. Because animated figures generally must couple to or include a power source and/or control mechanisms, the portability of the figures may be limited. For instance, the animated figures may remain fixed to a rig or may be implemented with a certain operational range. Moreover, actuators used to control the figures may be complex and expensive to replace when worn. As such, interaction of users (e.g., guests or operators) with the animated figures may be restricted to avoid excess wear on relatively expensive machinery.

SUMMARY

Certain embodiments commensurate in scope with the originally claimed subject matter are summarized below. These embodiments are not intended to limit the scope of the disclosure, but rather these embodiments are intended only to provide a brief summary of certain disclosed embodiments. Indeed, the present disclosure may encompass a variety of forms that may be similar to or different from the embodiments set forth below.

In an embodiment, a method of controlling an animated figure is provided. The method includes receiving, at a control surface, a control signal; generating, using a first electromagnetic control node of the control surface, a first magnetic field based at least in part on the received control signal; and generating, using a second electromagnetic control node of the control surface, a second magnetic field based at least in part on the received control signal, wherein the first magnetic field and the second magnetic field are configured to cause an animated figure on the control surface to actuate from a first configuration to a second configuration based at least in part on an interaction between at least one magnet of the animated figure and the first magnetic field, the second magnetic field, or both the first magnetic field and the second magnetic field.

In an embodiment, an animated figure control system is provided. The control system includes an animated figure comprising one or more magnets disposed in or on the animated figure; a control surface comprising a plurality of individually addressable control nodes, wherein each control node of the plurality of individually addressable control nodes is configured to generate a magnetic field in response to a control signal; and an animation controller configured to generate the control signal, wherein the control signal is configured to cause a first subset of the plurality of individually addressable control nodes to generate a first magnetic field and to cause a second subset of the plurality of individually addressable control nodes to generate a second magnetic field, such that the first magnetic field and the second magnetic field interact with the one or more magnets of the animated figure.

In an embodiment, a method of controlling an animated figure is provided that includes detecting a position of the animated figure on a control surface, the animated figure comprising one or more magnets disposed in or on the animated figure; controlling a first subset of electromagnetic control nodes of a plurality of electromagnetic control nodes of the control surface to generate a first magnetic field based at least in part on the position; detecting an updated position of the animated figure after controlling the first subset of electromagnetic control nodes; and controlling a second subset of electromagnetic control nodes of the plurality of electromagnetic control nodes of the control surface based at least in part on the detected updated position.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

Figure 1:
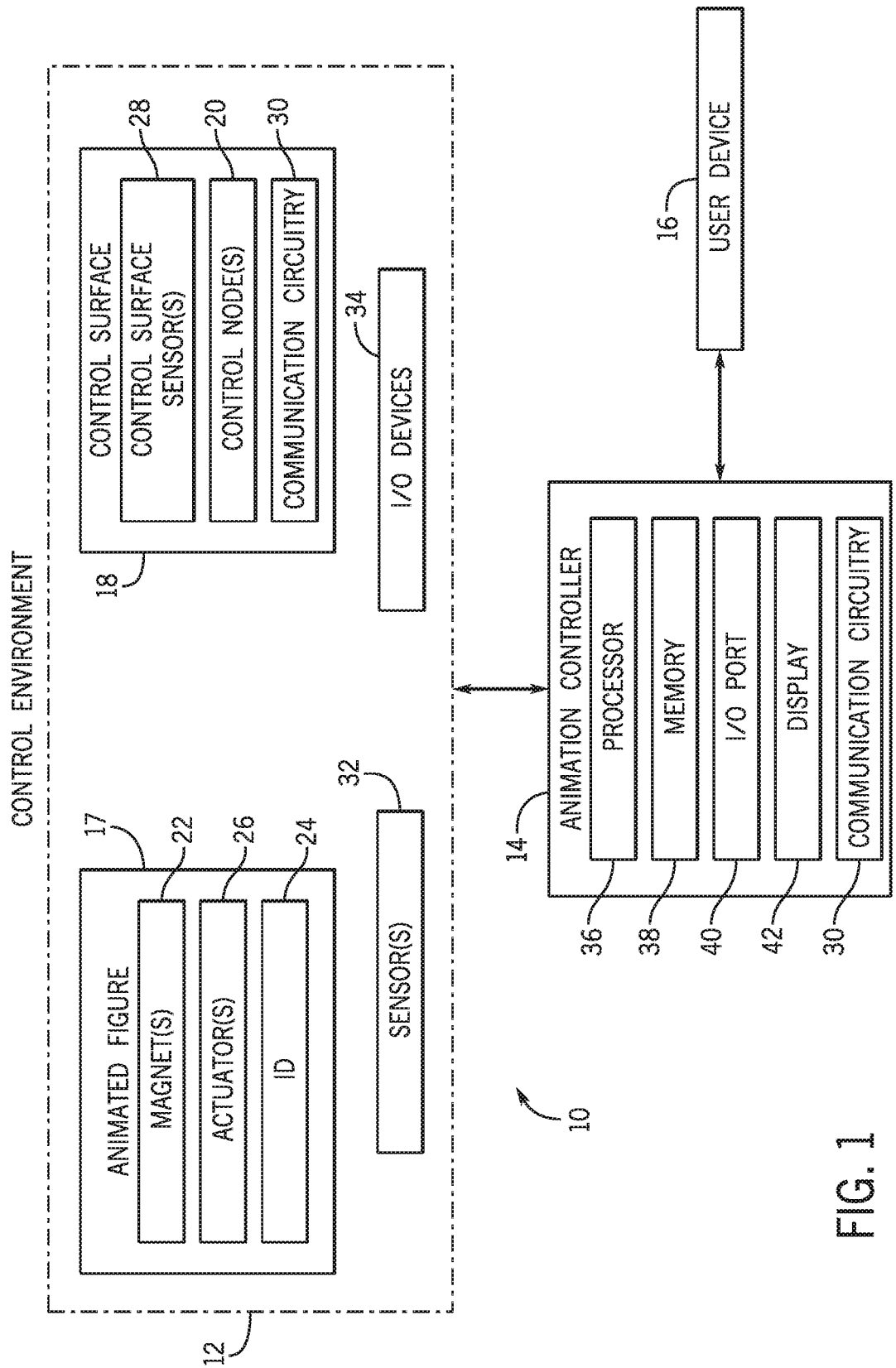
FIG. 1 is a block diagram of an embodiment of an electromagnetic control system for an animated figure, in accordance with aspects of the present disclosure.

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

As discussed in detail below, embodiments of the present disclosure relate generally to an electromagnetic control system for an animated figure. An animated figure includes a character (e.g., a plush toy, robot, simulated human, simulated animal) that is animated/moved via actuatable features (e.g., hydraulics, inflatable/expandable cells, engines, levers). More specifically, the present disclosure relates to techniques for actuating an animated figure using addressable control nodes (e.g., electromagnetic coils) of an electromagnetic array. For example, an amusement park may include a control surface implemented to include the electromagnetic array. Further, an animated figure may include magnets and/or magnetized components, such as metallic pads, in one or more locations (e.g., a head, arm, leg, tail, and/or the like) of the animated figure. Accordingly, while the animated figure may lack an internal power source and/or connections to an external power source, the animated figure may be controlled (e.g., actuated) via an external electromagnetic control surface that facilitates magnetic interaction between the control surface and the integral magnets of the animated figure. In this manner, expensive internal components of the animated figure are reduced or eliminated. As such, the animated figure may be cheap, portable, and attractive to guests (e.g., guests of the amusement park). Moreover, interaction between the animated figure and the guests or other animated figure may be facilitated, as the animated figure may lack expensive internal machinery that is sensitive to repeated guest interactions or that may be damaged. It should be noted that the terms character, puppet and/or figure are interchangeably utilized throughout this disclosure to reference physical figures that may have their movement controlled to provide an illusion of autonomous movement.

Also provided herein is an electromagnetic control system for an animated figure that may be controlled in a user-friendly manner. To achieve improved motion or animation of an animated figure, a creator-side animation tool is provided that presents the animator with a set of virtual controls and physics-based constraints that mimic the physical array, and its capabilities and limitations, such as maximum magnetic attraction/repulsion distances, real time hall effect sensor inputs to the system, and methods for interpolating a magnet between neighboring electromagnets in the array. In this manner, an animation creator may input a desired motion pattern using inputs to a graphical user interface and/or inputs from a test animated figure being physically manipulated to move in the desired motion pattern.

Turning to the drawings, FIG. 1 is a block diagram of an electromagnetic control system 10 for an animated figure, which may be included in an amusement park. The electromagnetic control system 10 may include a control environment 12, as well as control devices communicatively coupled to the control environment 12, such as an animation controller 14 and/or a user device 16. As shown in the illustrated embodiment of FIG. 1, the control environment 12 may include an animated figure 17, such as a plush toy, a character, a puppet, and/or the like. Further, the control environment 12 may include a control surface 18, which may be implemented to control (e.g., actuate) movements of the animated figure 17. More specifically, the control surface 18 may include an electromagnetic array that may, using individually addressable control nodes 20 (e.g., electromagnetic control nodes and/or electromagnetic coils), exert a force on a magnet 22 (e.g., a permanent magnet, an electromagnet) disposed on and/or within the animated figure 17 to cause the animated figure 17 to move, as described in greater detail below. Moreover, in some embodiments, the animation controller 14 and/or the user device 16 may be implemented to control operation of the control surface 18 (e.g., via one or more control signals). To that end, the control surface 18 may be programmed to cause the animated figure 17 to move from a first position to a second position and so on.

In some embodiments, the animated figure 17 may be plush toy and/or soft object. For example, the animated figure 17 may be stuffed with cotton, beads, beans, and/or the like. Additionally or alternatively, the animated figure 17 may be constructed from another material, such as plastic and/or silicone. Further, in some embodiments, the animated figure 17 may be a simple and/or inexpensive toy, which may be attractive to guests. Additionally, the animated figure 17 may include an identifier 24 that may uniquely identify the animated figure 17, may associate the animated figure 17 with a particular guest (e.g., with an identifier associated with the guest), may identify the animated figure 17 as a certain type or class of animated figure 17, and/or the like, as discussed in detail below. The identifier 24 may be associated with a tag, such as a radio-frequency identification (RFID) chip, a barcode, a quick response (QR) code, and/or the like. The tag may be disposed on or in the animated figure 17.

Moreover, the animated figure 17 may be powerless or passive. For instance, the animated figure 17 may lack an internal power source, such as a battery, and may lack external hardwire connections (e.g., wiring, an outlet, a plug, and/or the like) to be coupled to an external power source. As discussed above, the animated figure 17 may include one or more magnets 22 and/or magnetized components, such as metallic structures (e.g., ferrous metal pieces), that may be controlled by the control surface 18. To that end, the control surface 18 exerts a magnetic force on the magnets 22 to alter the position of the magnets 22 to cause the animated figure 17 to be actuated (dance, move, slide, and/or the like). The motion of the animated figure 17 may also be accentuated and/or aided by actuators 26, such as a lever or an air bladder. For instance, the animated figure 17 may include a first component, such as a foot, that includes a magnet 22 and a second component, such as a head, that includes one or more levers coupled to the magnet. In some embodiments, the one or more levers may be implemented to cause the second component of the animated figure 17 to turn in response to movement of the first component, which may be caused by the magnet 22 being repelled from or attracted to a certain position on the control surface 18.

The control surface 18 may include an array of individually addressable control nodes 20, such as an addressable electromagnetic array. The control nodes 20 may include an electromagnetic coil and associated circuitry, such as connection wiring. Further, the control nodes 20 may be controlled to produce a magnetic field with a certain intensity and polarity. More specifically, in some embodiments, because the array may include individually addressable control nodes 20, an intensity and a polarity of a respective local magnetic field may be controlled for each of a set of control nodes 20. To that end, a first portion of the control surface 18 corresponding to a first set or a first subset of control nodes 20 may attract the magnets 22 of the animated figure 17, while a second portion of the control surface 18 corresponding to a second set or a second subset of control nodes 20 may simultaneously repel the magnets of the animated figure 17, which may cause the animated figure 17 to move away from the second portion of the control surface 18 and towards the first portion of the control surface 18.

The control surface 18 may also include one or more control surface sensors 28, such as Hall-effect sensors and/or pressure plates (e.g., pressure sensors). In some embodiments, the control surface 18 may include a respective control surface sensor 28 associated with each control node 20. In other embodiments, the control surface 18 may include a respective surface sensor 28 for a subset of control nodes 20. Additionally, the control surface 18 may be implemented to detect, based at least in part on a magnetic field strength, the presence and location of an object proximate to the control surface 18. For instance, the control surface 18 may be implemented to detect, using the control surface sensors 28, the presence and location of the animated figure 17 on the control surface 18 based at least in part on the magnetic field interactions between the control nodes 20 and the magnets 22 of the animated figure 17. Additionally or alternatively, the presence and location of the animated figure 17 may be determined based in part on a pressure the animated figure 17 exerts on one or more pressure plates. The sensor 28 may be, additionally or alternatively, an optical sensor or a camera. Furthermore, instructions provided to the control surface 18 that may cause a particular motion or position (e.g., configuration) of the animated figure 17 may be determined (e.g., dynamically determined) based at least in part on data captured by the control surface sensors 28. Based on the position of the animated figure 17 captured by the sensors 28, the appropriate control signal may be generated to cause certain control nodes 20 associated with the position to generate a magnetic field. Further, the animation controller 14 may dynamically adjust the control signal if the animated figure 17 is not responding in a predicted manner. That is, if the control signal is generated to cause the animated figure 17 to move from a first position to a second position, the sensor 28 may acquire position data to determine if the second position has been achieved by the animated figure 17. If not, the control signal (i.e., activation of certain control nodes 20) may be adjusted until the animated figure 17 has achieved the second position. For example, a magnetic field strength of the nodes 20 may be increased or decreased. In another example, additional and/or different nodes may be activated to adjust the animated figure's position until a desired predetermined position is achieved (e.g., the second position). Once in the second position, the control signals that cause subsequent parts of the motion pattern may resume. The motion pattern may be a preprogrammed motion pattern or may be a motion pattern based on user identification acquired from the user device 16 and/or identifier information from a figure identifier 24.

A user may place the animated figure 17 on any part of the control surface 18 to cause a particular motion pattern to be initiated, no matter the position of the animated figure 17 on the control surface 18. In another example, the control surface 18 may include one or more indicators that indicate where a user should position the animated figure 17 on the control surface 18. Such an embodiment may be beneficial in the case where many users are positioning various different figures 17 on the surface 18 and separation of the figures 17 to avoid overlapping magnetic fields is desirable.

In some embodiments, the control surface 18 may be implemented in a table top, a fixed surface, a flexible strip, a wall, a scenery element, a prop, a wearable garment (e.g., a shirt, a hat and/or helmet, gloves), and/or the like. The control surface 18 may also include communication circuitry 30 implemented to facilitate wireless and/or wired communication between the control surface 18 and another device, as discussed in greater detail below. To that end, the control surface 18 may be implemented to communicate with the animation controller 14, a user device 16, and/or the like.

Moreover, the control environment 12 may include a number of sensors 32, such as a radio-frequency identification (RFID) sensor, a camera, an infrared (IR) sensor, a motion sensor, and/or the like. The sensors 32 may be implemented to capture additional information associated with the control environment 12 and/or the animated figure 17. For instance, in some embodiments, the RFID sensor may capture data corresponding to the identifier 24 of the animated figure 17 by reading a RFID chip included in the animated figure 17. Further, the sensors 32 may capture information corresponding to a guest in the control environment, such as an identifier associated with the guest, a location of the guest in the control environment 12, and/or the like. In some embodiments, the sensors 32 may be external to the control surface 18. However, the sensors 32 may additionally or alternatively be implemented in the control surface 18 and/or may be coupled to the control surface 18.

Further, the control environment may include a number of input/output (I/O) devices 34, such as speakers, a display, lights, controls (e.g., buttons, knobs, a touch screen, a joystick) and/or the like. Accordingly, the control environment 12 may produce a number of visual and/or audio effects. Further, as described in detail below, the input/output devices 34 may provide input to and/or receive control signals from the animation controller 14. For instance, in some embodiments, the animation controller 14 may pair a motion sequence performed by the animated figure 17 with the visual and/or audio effects. Additionally, the I/O devices 34 may provide input signals to the animation controller 14 to control the movement and/or configuration of the animated figure 17 (e.g., via the control surface 18). For example, controls may be implemented such that turning a knob, pressing a button, or interacting with other controls may cause the control surface 18 to actuate the animated figure 17.

In some embodiments, the animation controller 14 (e.g., electronic controller) may include a processor 36, a memory 38, input/output (I/O) ports 40, a display 42, communication circuitry 30, and/or the like. In certain embodiments, the memory 38 is configured to store instructions, data, and/or information, such as a library of animations (e.g., database or selectable available animation options) for the animated figure 17 or a group of animated figures 17. Additionally or alternatively, the memory 38 may include a user-defined algorithm for a responsive animation. For instance, the algorithm may be implemented such that responsive to receiving an input at the animation controller 14, the algorithm may determine a configuration of the animated figure 17 associated with the input, and the animation controller 14 may update the configuration of the animated figure 17 based on the determined configuration. It should be noted that although examples provided herein may describe the animation library, the approaches disclosed may use other animations or algorithms, or both.

The memory 38 and/or storage may be any suitable articles of manufacture that may serve as media to store processor-executable code, data, or the like. These articles of manufacture may represent non-transitory, computer-readable media (e.g., any suitable form of memory or storage) that may store the processor-executable code used by the processor 36 to perform the presently disclosed techniques. The memory 38 and/or the storage may also be used to store data, various other software applications, and the like. For example, the memory 38 and/or the storage may not only store the processor-executable code used by the processor 36 to perform various techniques described herein but code for other techniques as well. It should be noted that the term "non-transitory" merely indicates that the media is tangible and not a signal.

In certain embodiments, the processor 36 is configured to receive input signals from an input device, such as the user device 16, the control surface 18, sensors 32 and/or the I/O devices 34, relating to the control environment 12. For instance, the processor 36 may receive an input signal from the user device 16 to cause the animated figure 17 to change positions (e.g., configurations). In some embodiments, the control surface 18 may communicate the position and/or the location of the animated figure 17 on the control surface 18 based at least in part on sensor data captured by the control surface sensors 28. Further, the sensors 32 may provide sensor data captured by a camera, a RFID sensor, an IR sensor, and/or the like. More specifically, the sensor data may provide identification information associated with the animated figure 17, such as information associated with the identifier 24, and/or information associated with a guest in or proximate to the control environment 12.

After receiving the input signals and/or input data, the animation controller 14 may facilitate control of the animated figure 17 using the processor 36 to select an animation from the library of animations that may be stored in the memory 38, based at least in part on the input. The animation library may include, for example, a list of available animations or animation patterns, such as a first animation option (e.g., move the animated figure 17 in a first direction), a second animation option (e.g., move the animated figure 17 in a second direction), a third animation option (e.g. move a component of the animated figure 17 to a first configuration), a fourth animation option (e.g., move the component of the animated figure 17 to a second configuration), a fifth animation option (e.g., cause the animated figure 17 to dance), a sixth animation option (e.g., cause the animated figure 17 to wave), and so forth. In certain embodiments, the animation options may be stored in the memory 38. In some implementations, the processor 36 may be configured to select one or more animations to be performed in sequence (e.g., animation sequence). For instance, in response to a certain input or set of inputs, the animation controller 14 may be configured to control the animated figure 17 using a predetermined sequence, such as a performance sequence. In one example, an animation option is selected based on the information captured from or read from the identifier 24. In this manner, animation options appropriate for particular animated figure 17 and/or magnet location configurations (e.g., four legs with magnets on each leg, wings with one or more magnets per wing) of the animated figure 17 may be initiated based on the identifier information.

As described above, the animation controller 14 may be used to control the various components of the animated figure 17. In the depicted embodiment, the processor 36 of the animation controller 14 may execute instructions stored in the memory 38 to perform operations, such as selecting an animation (e.g. move, spin, dance, wave, stand, sit) to execute on the animated figure 17. As such, in some embodiments, the processor 36 may be one or more general-purpose microprocessors, one or more application specific processors (ASICs), one or more field programmable gate arrays (FPGAs), or any combination thereof. Additionally, the memory 38 may be a tangible, non-transitory, computer-readable medium that stores instructions executable by and data to be processed by the processor 36. Thus, in some embodiments, the memory 38 may include random access memory (RAM), read only memory (ROM), rewritable non-volatile memory, flash memory, hard drives, optical discs, and the like.

Furthermore, the animation controller 14 may enable the communication circuitry 30 to interface with various other electronic devices, such as the user device 16, the control surface 18, and/or the like. For example, the communication circuitry 30 may allow the animation controller 14 to communicatively couple to a network, such as a personal area network (PAN), a local area network (LAN), and/or a wide area network (WAN). Accordingly, in some embodiments, the animation controller 14 may process data from the user device 16 and communicate it to the control surface 18 via the communication circuitry 30 to control the animated figure 17. For example, after processing sensor data inputs from the input device 53, the processor 36 may enable the communication circuitry 30 to wirelessly transmit data to the control surface 18 (e.g., to the communication circuitry 30 of the control surface 18) to facilitate the control surface 18 enabling the animated figure 17 to output one or more animations (e.g. move, point, turn, spin, change positions, stand, sit, smile). In further configurations, the communication circuitry 30 may be wirelessly connected, or may be connected via a wired connection, to the control surface 18 and/or an additional component of the electromagnetic character control system 10 (e.g., the sensors 32, the user device 16). Additionally, in some embodiments, the animation controller 14 may include input/output (I/O) ports 40, which may interface to other peripheral components, such as input devices (e.g., keyboard, mouse), sensors 32, input/output (I/O) devices 34, and the like.

In some implementations, the animation controller 14 may also be configured to display an indication of available animations (e.g., a list of animations or algorithms stored in the library in the memory 38), as well as an indication of the selected movements, features, and/or animation on a display 42 (e.g., a display of text, images, graphics) of the animation controller 14 for visualization purposes. The display may also be available for monitoring or making administrative changes to the animation controller 14 and/or the animated figure 17 (e.g., via the control surface 18). Thus, an operator may modify the possible animation options, such as by expanding the animation option library to improve the interaction of the animated figure 17 with guests. Moreover, using the display 42, the operator may override and assign one or more available animations to one or more guests (e.g., guest identifiers) and/or figures 17. Thus, in some embodiments, the multiple animations provided on the display 42 may be changed, modified, switched, delayed, or deleted by the operator, thereby enabling updated animations. In some embodiments, the processor 36 may be configured to instruct the display 42 to display a list of previously performed animations, which may facilitate selection of future animations.

It should be noted that the components described above with regard to the animation controller 14 are exemplary components and the animation controller 14 may include additional or fewer components compared to those shown.

Additionally, it may be appreciated that the functional blocks described herein may be implemented with any suitable combination of hardware and software. Moreover, in some embodiments, the animation controller 14 may be included in the control surface 18, implemented in the control environment, or implemented in a location remote from the control surface 18. Additionally, it should be noted that the user device 16 may also include similar components as described as part of the animation controller 14. For instance, in some embodiments, the user device 16 may include the animation controller 14. Additionally or alternatively, the user device 16 may be an electronic device, such as a cellular phone, a remote control, a tablet, and/or the like, implemented to communicate directly with the control surface 18 and/or communicate with the control surface 18 via the animation controller 14. Accordingly, embodiments described herein are intended to be illustrative and not limiting.

Figure 2:
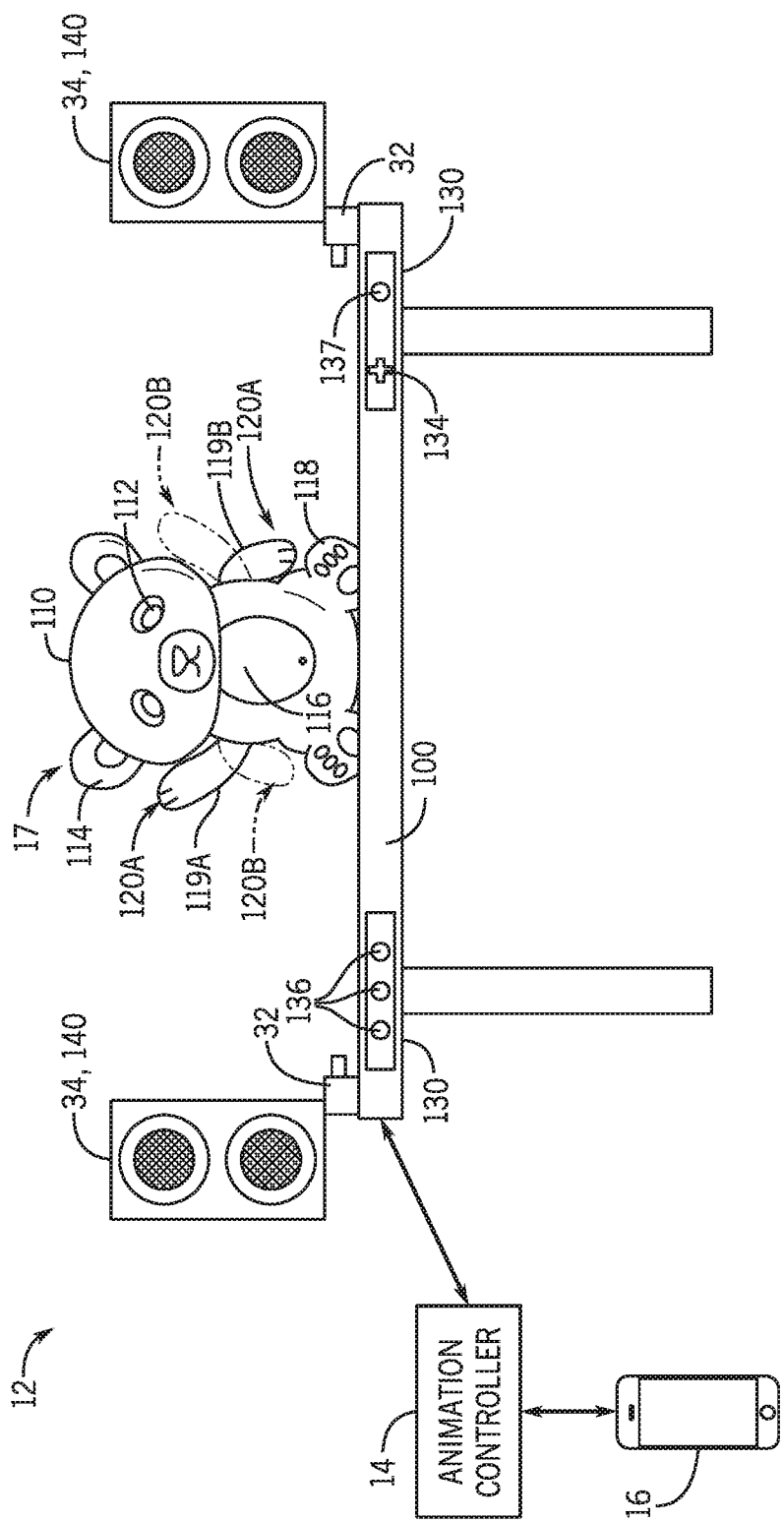
FIG. 2 is a schematic of an embodiment of a control environment of the electromagnetic control system of FIG. 1, in accordance with aspects of the present disclosure.

To help illustrate the features described herein, a schematic diagram of an example of the control environment 12 is shown in FIG. 2. More specifically, FIG. 2 illustrates an example of the control environment 12 implemented in an amusement park. As illustrated, the control surface 18 is implemented in a tabletop 100. Further, in the illustrated embodiment, the animated figure 17 is a bear, which may include a head 110, eyes 112, ears 114, a torso 116, legs 118, arms 119, and a tail (not shown). As additionally illustrated, the animated figure 17 is positioned in a first configuration 120A (e.g., a first position). More specifically, a first arm 119A of the animated figure 17 is raised, while a second arm 119B of the animated figure 17 is relaxed. In some embodiments, to maintain the first arm 119A in the raised position of the first configuration 120A, the animation controller 14 may instruct a set of control nodes 20 beneath the first arm 119A to exert a force with a certain polarity and intensity on a magnet 22 within the first arm 119A. That is for example, the control nodes 20 may repel the magnet 22 within the first arm 119A so that the first arm 119A raises and/or remains in the raised position.

As described herein, the animation controller 14 may instruct the control surface 18 in response to receiving an input. As further described herein, in some embodiments, the input may correspond to a sequence of animations (e.g., a sequence of configurations 120). Accordingly, in some embodiments, the animation controller 14 may instruct the control surface 18 to actuate the animated figure 17 from the first configuration 120A to a second configuration 120B. For instance, as shown in the illustrated embodiment, the control surface 18 may actuate the animated figure 17 such that the first arm 119A is lowered and the second arm 119B is raised to reach the second configuration 120B. To that end, the control nodes 20 beneath the first arm 119A may attract or exert no force on the magnet 22 in the first arm 119A, while a set of control nodes 20 beneath the second arm 119B may repel a magnet 22 in the second arm 119B such that the second arm 119B is raised. Moreover, in some embodiments, the sequence of animations may be looped or repeated. As such, by instructing the control surface 18 to actuate the animated figure 17 between the first configuration 120A and the second configuration 120B and, optionally, through additional configurations, for a certain duration or number of instances, the animated figure 17 may appear to dance.

Further, as discussed above, the animation controller 14 may receive an input to actuate the figure from a user device 16 and/or an I/O device 34. For instance, in some embodiments, the control environment 12 may include a control assembly 130, which may be an I/O device 34 and/or may be a component of the animation controller 14. The control assembly may include a control pad 134, buttons 136, a control wheel 137 (e.g., knob), and/or the like. It should be recognized that the control assembly 130 may include more than one of the control pads 134 and any suitable number of buttons (e.g., 1, 3, 4, 5, 6, 7, 8, 9, 10, or more than 10 buttons). Furthermore, each of the control pad 134, the buttons 136, and the control wheel 137 may actuate a different movement, sound, and/or other effect to be performed by the animated figure 17 and/or the I/O devices of the control environment 12.

For example, in some embodiments, the control assembly 130 may be used to adjust a position of the head 110, eyes 112, arms 119, legs 118, and/or torso 116 of the animated figure 17. The configuration of the magnet/s 22 disposed on or in the animated figure 17 may be selected based on the form of the animated figure 17. In one embodiment, one or more magnets 22 may be disposed on or in the head 110, eyes 112, arms 119, legs 118, and/or torso 116 of the animated figure 17. For example, the magnet 22 may be positioned under one or more layers of fabric (or other material/s forming an exterior of the animated figure 17) at an end of the legs 118, corresponding to an area configured to be in direct contact with the control surface 18 during a walking actuation and to place the magnet 22 closer to the control surface 18 during certain types of motion. That is, one or more magnets 22 may be arranged on or in the animated figure 17 to correspond to a limb terminus. The size, position, and/or type of the magnets 22 in or on the animated figure 17 may be selected based on the desired animation patterns for the animated figure 17. The control assembly 130 may be used to adjust the ears, fingers, wings, toes, tail, and/or an additional component of the animated figure 17. More specifically, the control assembly 130 may control linear movement of a portion of the animated figure 17 and/or rotational movement of the portion of the animated figure 17. Further, in some embodiments, the buttons 136 may be used to actuate the animated figure 17 according to a predetermined animation sequence (e.g., a dance sequence, a puppet show sequence). Additionally or alternatively, the control assembly may be used to output audio or additional effects from the I/O devices 34 in the control environment, such as speakers 140. It should be recognized, that the control pad 134, the buttons 136, and the control wheel 137 may be used to control any suitable movement of the animated figure 17. In one embodiments, certain pairing or groups of animated figures 17 may execute different coordinated motion patterns based on type. For example, an animated figure 17 of a first type may execute a first motion pattern (e.g., a first type of dance) when on the control surface 18 with an animated figure 17 of a second type. However, when the first type of animated figure 17 is on the control surface 18 with a different or third type of animated figure 17, the first type of animated figure 17 executes a motion pattern of a different or second type (e.g., a second type of dance). The opposing pair may execute the same motion pattern as the other animated figures 17 on the control surface 18 or may execute their own characteristic motion patterns based on the pairing. In this manner, a user may experience different motion patterns that appears to be different interactions between different animated figure 17.

In some embodiments, the animated figure 17 may include different characteristics or components, such as wings, tails, fingers, accessories, and/or the like. To that end, the animated figures 17 may belong to different classes (e.g., types). For example, in some embodiments, the control surface 18 may control actuations of a bear, as illustrated. Additionally or alternatively, the control surface 18 may control actuations of a bird, which may include wings. Further, in some embodiments, the actuations available in the animation library for the bear may differ from the actuations available in the animation library for the bird. To that end, the animation controller 14 may accommodate the physical and/or mechanical differences between different types of figures 17. Each different type of animated figure 17 may be identified via its respective identifier 24.

Further, in some embodiments, the control surface 18 and/or the animation controller 14 may be implemented to simultaneously control multiple figures 17. Accordingly, in some embodiments, the animation controller 14 may use inputs from sensors 32 and/or the control surface sensors 28 to locate and identify the different figures 17, as well as to differentiate actuation controls between the different figures 17. For instance, in some embodiments, cameras, RFID sensors, and/or the like may identify an animated figure 17 and/or identify the type (e.g., class) corresponding to the animated figure 17. Moreover, the control surface sensors 28 and/or the sensors 32 may determine the location of the animated figure 17 and its components. Based on the identification of the animated figure 17 and its location, the animation controller 17 may determine a set of control nodes 20 and a suitable set of control signals to transmit to the control nodes 20 to actuate the animated figure 17 according to an animation that corresponds to the animated figure 17.

While the disclosed embodiment is discussed in the context of a control surface 18, in certain embodiments, the animated figure 17 may additionally or alternatively include one or more electromagnets that may interact with a metal (e.g., ferrous) surface.

Figure 3:
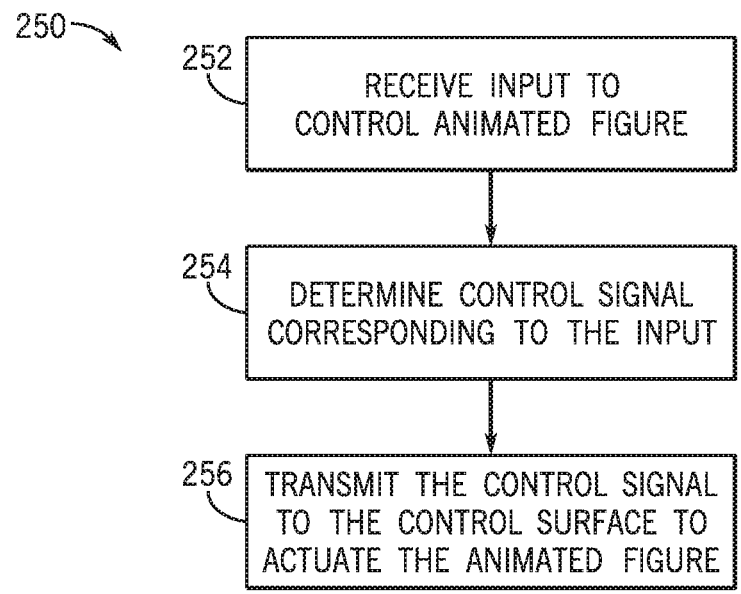
FIG. 3 is a flow chart of a method for outputting an animation to an animated figure via the electromagnetic control system of FIG. 1, in accordance with aspects of the present disclosure.

FIG. 3 is a process flow diagram for a method 250 for outputting an animation to the animated figure 17. It should be noted that the method 250 may be performed as an automated procedure by a system, such as the electromagnetic character control system 10 having the animated figure 17 the animation controller 14, and/or the like. Although the flow diagram illustrates the steps in a certain sequence, it should be understood that the steps may be performed in any suitable order and certain steps may be carried out simultaneously, where appropriate. Further, certain steps or portions of the method 250 may be omitted and other steps may be added.

The method 250 may be initiated by an input to control the animated figure 17 being received (process block 252). As described herein, in some embodiments, the input may be received at the animation controller 14 from the user device 16, the I/O devices 34, such as the control assembly 130, and/or the like. Additionally or alternatively, the input may be received at the animation controller 14 via another input device communicatively coupled to the animation controller, such as a mouse, keyboard, touch-screen display, and/or the like. Moreover, in certain embodiments, the input may correspond to data sensed by the sensors 32, such as an input to control the animated figure 17 in response to detection of a guest and/or another factor present in the control environment 12.

As illustrated, the method 250 may proceed by a control signal corresponding to the input being determined (process block 254). For instance, the animation controller 14 may identify an animation sequence, which may be included in the animation library, that corresponds to the received input. To that end, in some embodiments, the input may correspond to a predetermined sequence of animations, such as an animation performance (e.g., puppet show), that the animation controller 14 may retrieve from memory 38. Alternatively, the input may correspond to an isolated animation or configuration. For example, while a first input, which may be received at the animation controller 14 in response to a button 136 being pressed, may correspond to a predetermined animation sequence, a second input, which may correspond to an input received at the control pad 134, may correspond to a real-time control and/or actuation of the animated figure 17. In some embodiments, the real-time control and/or actuation may also correspond to an animation in the animation library. Though, in some embodiments, the animation may be isolated from an animation sequence.

Moreover, to determine the control signal, the animation controller 14 may map an animation sequence to a suitable set of control nodes 20 on the control surface. For example, based in part on data received from the control surface sensors 28 and/or the sensors 32, the animation controller 14 may determine (e.g., access from a memory) the location and/or orientation of the components (e.g., the head 110, the torso 116, the arms 119, the legs 118) of the animated figure 17 and may determine the location of the control nodes 20 that may be suitable to actuate the animation sequence corresponding to the input. That is, for example, the animation controller 14 may determine the control nodes 20 in the array to be addressed by the control signal. Furthermore, the animation controller 14 may determine, based at least in part on the animation sequence, a control signal suitable to set and/or adjust the intensity and/or the polarity of the local magnetic fields of the control nodes 20 to a respective setting. In some embodiments, for example, the polarity and/or intensity set by the control signal may vary based on the animation and on the type of animated figure 17 being controlled, as certain animated figures 17 may have different components and/or magnets 22 with different strengths.

After the control signal is determined, the control signal may be transmitted to the control surface 18 to actuate the animated figure 17 (process block 256). More specifically, the control signal may be addressed to the control nodes 20 determined to be suitable to actuate the animation sequence. As such, the control nodes 20 may receive the control signal and may, based at least in part on an intensity and/or a polarity of a magnetic field produced as a result of the control signal, actuate the animated figure 17. As described herein, actuating the animated figure 17 may cause the animated figure 17 to dance, wave, move, slide, walk, change positions, and/or the like. It should be understood that the animated figured 17 may include features such as internal scaffolding or frames that help maintain a desired position of the animated figure 17. Further, the animated figure 17 may include support features that maintain an orientation of each magnet 22 with respect to the control surface 18 and that prevent reversal of magnet orientation. For example, a repulsed magnet 22 may have a tendency to flip to an attraction orientation. Internal support structures of the animated figure 17 may brace each magnet 22 to prevent flipping or undesirable changes in orientations.

Figure 4:
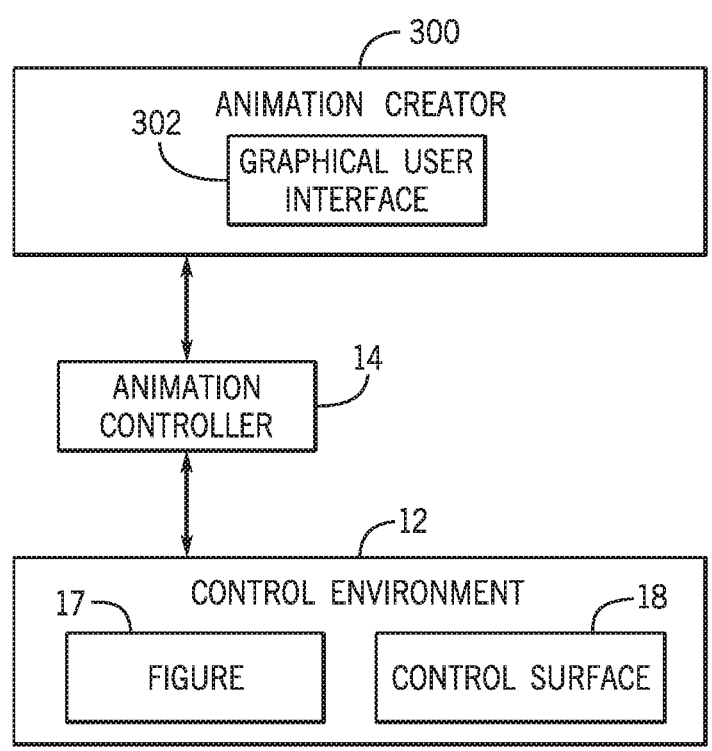
FIG. 4 is a block diagram of an embodiment of an animation creator configured for use in conjunction with the electromagnetic control system of FIG. 1, in accordance with aspects of the present disclosure.

As shown in FIG. 4, provided herein is an animation creator 300 that includes a graphical user interface 302 that permits modeling of animation motions. In one embodiment, a user's own interactions with the animated figure 17 on the control surface 18 may be provided as input to the animation controller 14. For example, the input may be as part of a natural motion input training or library, in which a user moves or mechanically manipulates the animated figure 17 over the control surface 18, during which time the animation controller 14 may read and record the voltages present at each control node 20 over time based on interaction with the integral magnets of the animated figure 17. In this manner, desired motion patterns may be recorded and, subsequently, used as control signals for control of figure 17 that are generated by the animation creator 300. Accordingly, the animation creator 300 may permit animation control for non-technical designers or users with no knowledge of advanced control system programming, to input natural motions, gestures and positioning into the system for recording and real time control, using only their hands guiding the animated figure 17. In one embodiment, the animation creator 300 may provide a virtual model of the control surface 18 and the desired and/or detected animated figure 17, and may render a virtual animation based on operator inputs of animation patterns. The user-mediated interactions may be used as inputs in one embodiment.

While only certain features of the disclosed embodiments have been illustrated and described herein, many modifications and changes will occur to those skilled in the art. It is, therefore, to be understood that the appended claims are intended to cover all such modifications and changes as fall within the true spirit of the disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U. S.C. 112(f).

The invention claimed is:

1. A method of controlling one or more animated figures, the method comprising:
   receiving first identification information associated with a first animated figure of the one or more animated figures;
   generating a first control signal to control the first animated figure based on the first identification information, wherein the first control signal is associated with a first motion pattern;
   receiving second identification information associated with a second animated figure of the one or more animated figures;
   generating a second control signal to control both the first animated figure and the second animated figure based on the first identification information and the second identification information, wherein the second control signal is associated with a second motion pattern;
   receiving, at a control surface, the first control signal and the second control signal;
   generating, using control nodes of the control surface, a first magnetic field based at least in part on the received first control signal; and
   generating, using the control nodes of the control surface, a second magnetic field based at least in part on the received second control signal, wherein the first magnetic field and the second magnetic field are configured to cause at least one of the one or more animated figures on the control surface to actuate from a first configuration to a second configuration.

2. The method of claim 1, wherein an interaction between at least one magnet of the at least one of the one or more animated figures and the first magnetic field, the second magnetic field, or both the first magnetic field and the second magnetic field comprises a repulsion of the at least one magnet.

3. The method of claim 2, wherein the interaction comprises an attraction of the at least one magnet of the at least one of the one or more animated figures.

4. The method of claim 1, comprising determining, using a controller, the first control signal or the second control signal based at least in part on an input received at the controller.

5. The method of claim 1, comprising determining, using a controller, the first control signal or the second control signal based at least in part on an animation library, wherein the animation library comprises information associated with a plurality of configurations, wherein the plurality of configurations comprises the first configuration and the second configuration.

6. The method of claim 1, wherein actuating the at least one of the one or more animated figures from the first configuration to the second configuration further comprises inflating or deflating an air bladder.

7. The method of claim 1, comprising receiving the first control signal or the second control signal in response to an input from a user device.

8. The method of claim 1, comprising detecting a position of one of the one or more animated figures using one or more sensors and generating the first control signal or the second control signal further based on the detected position.

9. The method of claim 1, comprising detecting an identifier of the first animated figure and generating the first control signal based on the first identification information received from the detected identifier.

10. An animated figure control system, comprising:
    an animated figure comprising one or more magnets disposed in or on the animated figure;
    a control surface comprising a plurality of individually addressable control nodes wherein each control node of the plurality of individually addressable control nodes is configured to generate a magnetic field in response to a control signal; and
    an animation controller configured to:
      record signals from one or more control nodes of the plurality of individually addressable control nodes associated with a motion pattern of the animated figure;
      receive instructions to activate the motion pattern; and
      generate the control signal, wherein the control signal is configured to cause a first subset of the plurality of individually addressable control nodes to generate a first magnetic field and to cause a second subset of the plurality of individually addressable control nodes to generate a second magnetic field, such that the first magnetic field and the second magnetic field interact with the one or more magnets of the animated figure to cause the animated figure to move according to the motion pattern.

11. The animated figure control system of claim 10, wherein the one or more magnets are in direct contact with the control surface.

12. The animated figure control system of claim 10, wherein the one or more magnets are positioned within the animated figure and are separated from the control surface by a material forming an exterior of the animated figure.

13. The animated figure control system of claim 10, wherein the animation controller is configured to generate the control signal to cause the animated figure to assume a first position based on an effect of the first magnetic field and the second magnetic field on the one or more magnets.

14. The animated figure control system of claim 10, wherein the animation controller is configured to generate a subsequent control signal to cause a third subset of the plurality of individually addressable control nodes to generate a third magnetic field.

15. The animated figure control system of claim 10, wherein the control surface is configured to generate the first magnetic field and the second magnetic field simultaneously.

16. A method of controlling an animated figure, the method comprising:
- detecting a position of the animated figure on a control surface, the animated figure comprising one or more magnets disposed in or on the animated figure;
- controlling a first subset of electromagnetic control nodes of a plurality of electromagnetic control nodes of the control surface to generate a first magnetic field based at least in part on the position;
- detecting an updated position of the animated figure after controlling the first subset of electromagnetic control nodes;
- determining that the updated position is not part of a motion pattern of the animated figure and controlling one or more electromagnetic control nodes of the plurality of electromagnetic control nodes until the animated figure achieves a predetermined position in the motion pattern; and
- resuming the motion pattern after the animated figure achieves the predetermined position by controlling a second subset of electromagnetic control nodes of the plurality of electromagnetic control nodes of the control surface.

17. The method of claim 16, wherein controlling the first subset of electromagnetic control nodes of the plurality of electromagnetic control nodes comprises increasing a strength of the magnetic field generated by the first subset of electromagnetic control nodes.

18. The method of claim 16, comprising detecting an identifier of the animated figure and controlling the first subset of electromagnetic control nodes based on the detected identifier, wherein the motion pattern is based on the detected identifier.

19. The method of claim 16, wherein the first subset of electromagnetic control nodes overlaps with but is not identical to the second subset of electromagnetic control nodes.

\* \* \* \* \*